United States Patent [19]

Fukata et al.

[11] Patent Number: 4,867,486
[45] Date of Patent: Sep. 19, 1989

[54] SOLDERING STRUCTURE OF TUBULAR MATERIAL

[75] Inventors: Akio Fukata; Yoshihisa Fujisawa, both of Saitama, Japan

[73] Assignee: Diesel Kiki Co., Ltd., Tokyo, Japan

[21] Appl. No.: 112,699

[22] Filed: Oct. 26, 1987

[30] Foreign Application Priority Data

Jan. 23, 1987 [JP] Japan .................... 62-7552[U]

[51] Int. Cl.⁴ ............... B21D 39/00; B21D 53/02; B23P 15/26; F16L 13/08
[52] U.S. Cl. ..................... 285/222; 285/287; 29/157.3 C; 29/157.4; 29/432; 29/523; 165/176; 228/173.2; 228/183
[58] Field of Search ............ 228/173.2, 173.3, 174, 228/56.3, 183, 157, 173.5, 173.1, 208, 210, 263.17, 263.16; 29/157.4, 157.3 C, 157.3 A, 432, 523; 165/176; 285/222, 287

[56] References Cited

U.S. PATENT DOCUMENTS

| | | | |
|---|---|---|---|
| 1,102,163 | 6/1914 | Opperud | 29/157.4 |
| 2,148,427 | 2/1939 | Howard et al. | 228/173.1 |
| 2,565,313 | 8/1951 | Lauck | 228/173.2 |
| 3,317,222 | 5/1967 | Maretzo | 29/157.4 |
| 4,207,662 | 6/1980 | Takenaka | 29/157.4 |
| 4,272,006 | 6/1981 | Kao | 228/183 |
| 4,606,491 | 8/1986 | Le Mong | 228/183 |

FOREIGN PATENT DOCUMENTS

| | | | |
|---|---|---|---|
| 0071595 | 6/1981 | Japan | 228/183 |
| 0040622 | 3/1985 | Japan | 228/173.2 |
| 1082525 | 3/1984 | U.S.S.R. | 29/157.4 |

OTHER PUBLICATIONS

"Soldering Manual," Kabushiki Kaisha Sanpo Corporate publication of Nov. 15, 1967, pp. 533 and 535.

Primary Examiner—Richard K. Seidel
Assistant Examiner—William Scott Andes
Attorney, Agent, or Firm—Wenderoth, Lind & Ponack

[57] ABSTRACT

A soldering structure of a tubular material for soldering one end portion of a tubular material to an auxiliary plate with a soldering material coated thereto, wherein the plane auxiliary plate is formed therein with a communicating hole for allowing the tubular material to be inserted therein, one end portion of the tubular material is inserted into the communicating hole and temporarily secured to the auxiliary plate through a deformation of the auxiliary plate at the end portion of the tubular material or the peripheral area of the communicating hole before soldering, thereby to close one end of a space between the peripheral surface of the tubular material and the inner wall of the communicating hole, the space allowing the soldering material melted to be pooled therein during soldering, and the tubular material and auxiliary plate being soldered when the melted soldering material pooled in the space is hardened.

6 Claims, 4 Drawing Sheets

FIG. 2
FIG. 3
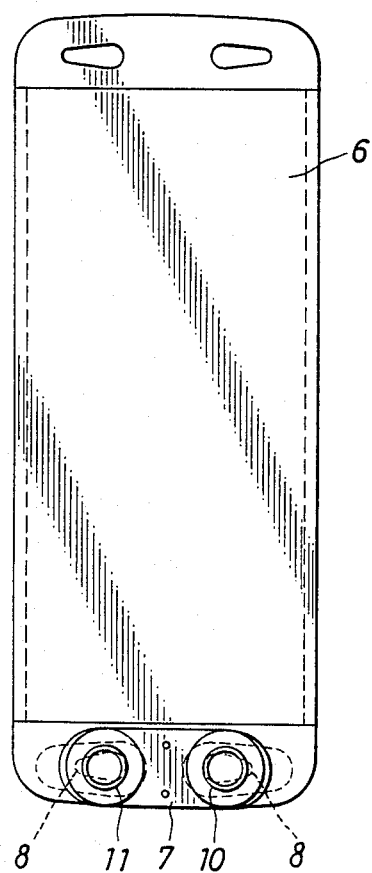
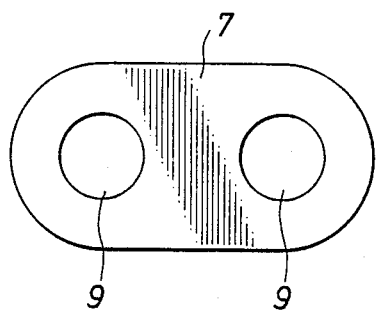

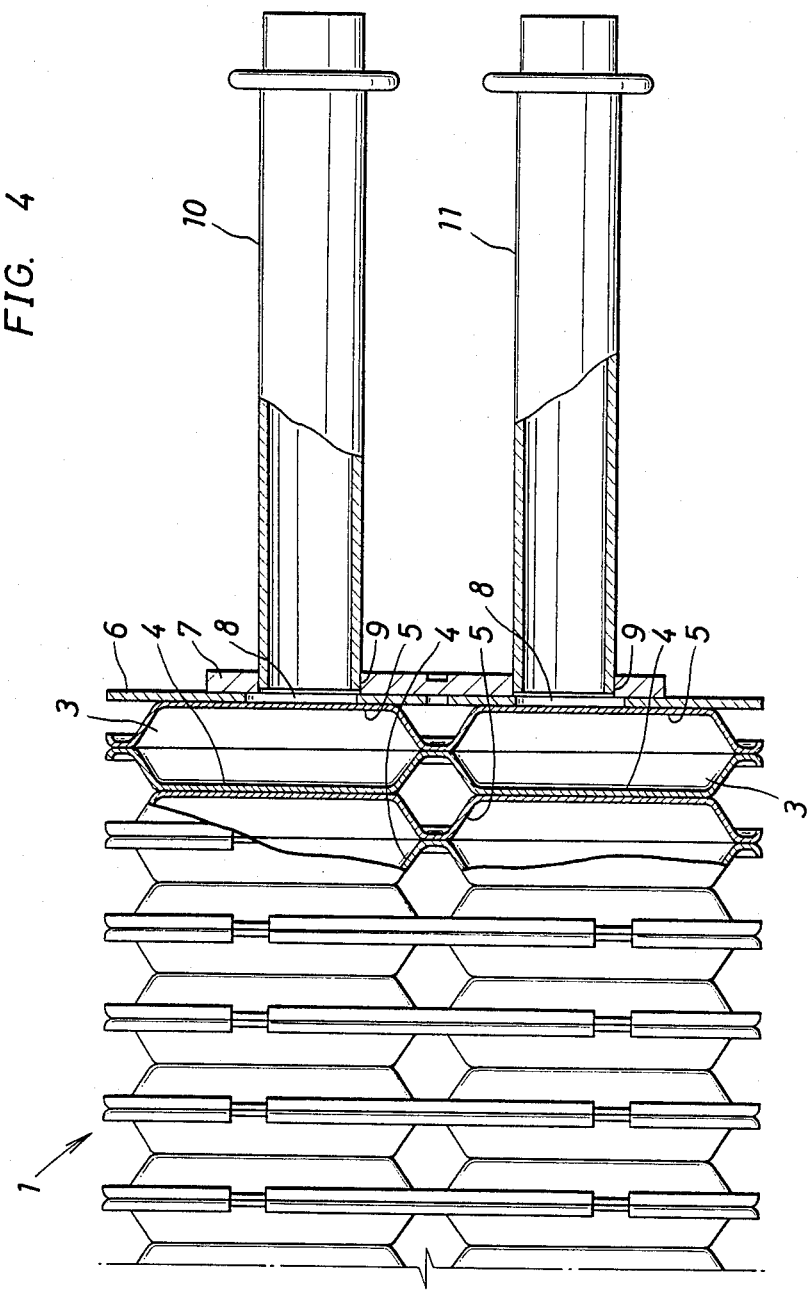

SOLDERING STRUCTURE OF TUBULAR MATERIAL

BACKGROUND OF THE INVENTION

1. Field of the Invention

This invention relates to a soldering structure of a tubular material which is simple in structure and yet able to prevent a shortage of a soldering material, thereby to increase the reliability of soldering.

2. Description of the Prior Art

Heretofore, when a cooling medium conduit, for example, is mounted on an end plate which defines an end portion of a lamination type evaporator, a predetermined portion of an auxiliary plate with a soldering material coated to both surfaces thereof, is subjected to burring, an end portion of a cooling medium conduit is inserted into the inner side of the burring portion projecting from one surface of the plate, a basic portion of the conduit is supported by the burring portion so as not to fall, on the other hand, the auxiliary plate is positioned at a predetermined position of the end plate, the end plate, the auxiliary plate, the cooling medium conduit, etc. are temporarily secured by a suitable clip means and are carried into a soldering furnace, and the soldering material coated on the surfaces of the auxiliary plate is melted in the furnace to solder these members.

However, the above-mentioned conventional soldering method has the shortcoming that when soldering, melted soldering material is flowed down between the inner side of the burring portion and the end portion of the cooling medium conduit which results in the generation of a shortage of soldering material, and poor soldering portions must to be retreated by a suitable welding method after soldering, and therefore, the processes become complicated and in addition, much labor is required and a high cost results.

SUMMARY OF THE INVENTION

It is therefore an object of the present invention to provide a soldering structure of a tubular material, in which the above-mentioned shortcoming is eliminated, the structure is simplified to prevent an occurrence of the shortage of soldering material, the reliability of the soldering is increased, and retreatment after soldering is not required.

Another object of the present invention is to provide a soldering structure of a tubular material, in which a tubular material or an auxiliary plate as an object member to be soldered is subjected to a simple treatment before the tubular material is soldered, and thereafter, they are temporarily secured so that smooth and complete soldering can be performed.

A further object of the present invention is to provide a soldering structure of a tubular material, in which one end portion of a tubular material before soldering is inserted into a communicating hole formed in an auxiliary plate until it reaches an intermediate portion thereof, the end portion of the tubular end is widened or the auxiliary plate is deformed at the portion adjacent to the communicating hole, and melted soldering material is pooled in a space between the peripheral surface of the end portion of the tubular material and the inner wall of the communicating hole, thereby to increase the soldering strength.

A still further object of the present invention is to provide a soldering structure of a tubular material which includes an auxiliary plate having an actually useful thickness which is obtained by totally reviewing the accuracy of the size of a tubular material after soldering and the presence of the shortage of a soldering material.

A yet further object of the present invention is to provide a soldering structure of a tubular material, which is suitable for soldering a pair of cooling medium conduits disposed side by side at the inlet and outlet ports of a laminating type evaporator to be used in an air conditioner.

A soldering structure of a tubular material of the present invention is characterized in that, in a soldering structure of a tubular material for soldering an end portion of a tubular material to an auxiliary plate with a soldering material coated thereto, a plane auxiliary plate is formed with a communicating hole for allowing the tubular material to be inserted therein, one end portion of the tubular material is inserted into the communicating hole, the tubular material before soldering is temporarily secured to the auxiliary plate through deformation of the end portion of the tubular material or a part of the auxiliary plate adjacent to the communicating hole, one end of a space formed between a peripheral surface of the tubular material and an inner wall of the communicating hole is closed, and melted soldering material is pooled in the space during soldering, thereby to solder the tubular material to the auxiliary plate.

The above-mentioned objects, features and advantages of the present invention will become more apparent from the following detailed description of the embodiment with reference to the accompanying drawings.

BRIEF DESCRIPTION OF THE DRAWINGS

FIG. 2 is a side view of FIG. 1;

FIG. 3 is a front view showing one example, in enlarged scale, of an auxiliary plate to which the present invention is applied;

FIG. 4 is a partly sectional view showing important parts, in enlarged scale, of the present invention;

DETAILED DESCRIPTION OF THE PREFERRED EMBODIMENT

Figure 1:
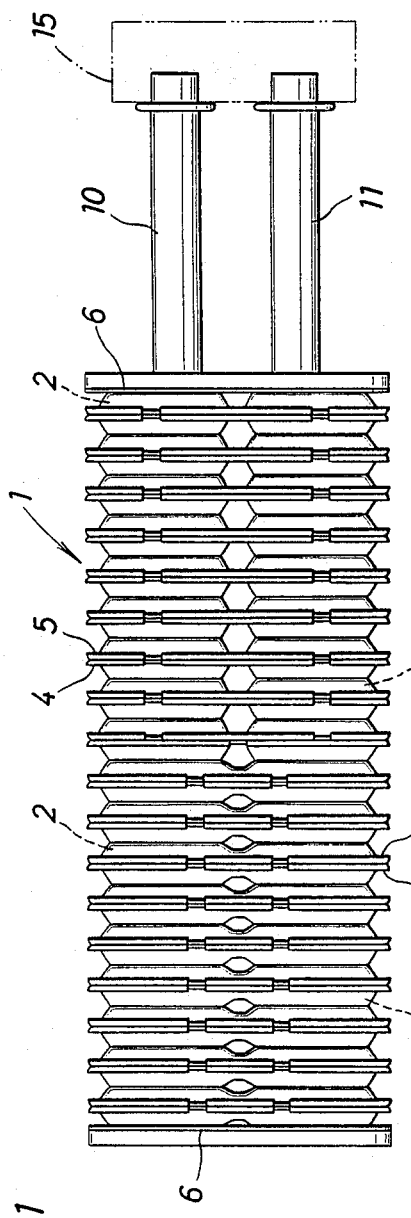
FIG. 1 is a plan view showing one example of a laminating type evaporator to which the present invention is applied.

The present invention will be described hereinafter with reference to the illustrated embodiment, in which the present invention is applied to a cooling medium conduit mounted to an end plate of a laminating type evaporator. In FIGS. 1 through 6, 1 denotes a laminating type evaporator provided at the upper and lower parts thereof with an upper header 2 and a lower header 3 comprising a plurality of upper and lower tanks, respectively. These headers 2 and 3 comprise header plates 4 and 5 formed of a thin aluminium plate having a generally W shape in section and faced with each other, the jointing edges of the header plates 4 and 5 being soldered together. Between the plane header plates 4 and 5 disposed adjacent with each other between the headers 2 and 3, a radiation fin (not shown) is mounted.

The upper and lower headers 2 and 3 are provided at both ends thereof with a vertically elongated end plate 6 formed of an aluminium plate and secured thereto. One of the end plate 6 is provided at the lower end portion with a generally oval-shaped auxiliary plate 7 formed of an aluminium plate thicker than the plate 6 and secured thereto. Formed at the same pitch in the position corresponding to the end plate 6 and the auxiliary plate 7 are through-holes 8 and communicating holes 9 communicating with the lower header 3. Each communicating hole 9 is provided therein with a cooling medium conduit 10 and a cooling medium conduit 11, the former serving as an inlet tubular material while the latter as an outlet tubular material, with each tubular end portion thereof soldered to the communicating hole 9.

The tubular end portions of the cooling medium conduits 10 and 11 are widened in a flange-shape within the communicating holes 9. The basic portions of the widened tubular portions 10a and 11a are engaged with the edge portions of the communicating holes 9 and the spaces between the peripheral surfaces of the cooling medium conduits 10 and 11 and the inner walls of the communicating holes 9 are closed at a generally intermediate portion of the thickness of the auxiliary plate 7. The cooling medium conduits 10 and 11 are secured through a melted soldering material pooled in the spaces as will be described hereinafter.

In the figures, reference numeral 12 denotes a soldering material coated to both front and reverse surfaces of the auxiliary plate 7 and reference numeral 13 denotes a jig for widening the end portions of the cooling medium conduits 10 and 11. The jig 13 has a tapered tip portion 14 which is gradually decreased in outer diameter as it goes towards the tip and able to be inserted into the cooling medium conduits 10 and 11. Reference numeral 15 denotes a box-type expansion valve mounted to the cooling medium conduits 10 and 11.

Figure 7:
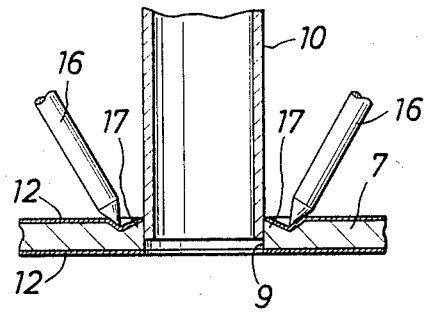
FIGS. 7 and 8 are sectional views showing a second and a third embodiment of the present invention.
Figure 8:
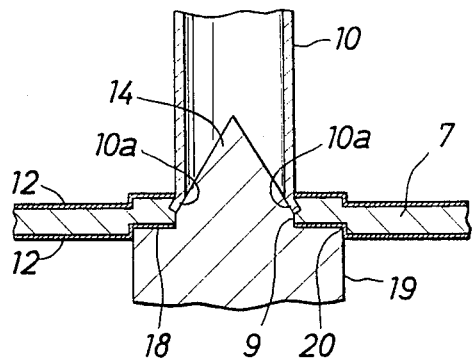

FIGS. 7 and 8 illustrate further embodiments of the present invention, in which corresponding parts to those of the preceding embodiment are denoted by corresponding reference numerals. The second embodiment of FIG. 7 is characterized in the following points. That is, the cooling medium conduits 10 and 11 are temporarily secured to the auxiliary plate 7, and instead of widening the end portions of the conduits 10 and 11 so as to be used as means for closing the spaces between the peripheral surfaces of the conduits 10 and 11 and the inner walls of the communicating holes 9, the end portions of the cooling medium conduits 10 and 11 are inserted into the communicating holes 9 and thereafter the tips of the jigs 16 are pierced into the peripheral areas of the opening portions of the communicating holes 9 to deform the peripheral areas into upwardly deformed portions 17 so that the spaces between the peripheral surfaces of the conduits 10 and 11 and the inner walls of the communicating holes 9 are closed by allowing the upwardly deformed portions 17 to pressure contact with or bite into the peripheral surfaces of the end portions of the conduits 10 and 11.

The third embodiment of FIG. 8 is characterized in the following points. That is, the end portions of the cooling medium conduits 10 and 11 are widened. In addition, the peripheral areas of the opening portions of the communicating holes 9 are depressed by an illustrated jig 9 having a pressure portion of a large diameter thereby to form a depressed portion 20 in a part of a contacting surface with respect to the end plate 6 so as to increase the stability of the conduit widening function. Moreover, the contact between the deformed portion formed by the jig 19 and the end plate 6 is avoided by the depressed portion 20, thereby to increase the stability and sure securement of the auxiliary plate 7 on the end plate 6.

Figure 5A:
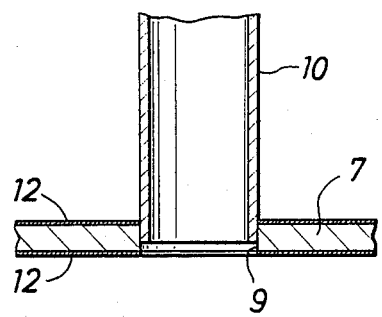
FIGS. 5(a) through 5(d) are sectional views showing important parts of the processes for temporarily securing a tubular material to an auxiliary plate in order.

With the above-mentioned soldering structure of a tubular material, when the cooling medium conduits 10 and 11 are attached to the end plate 6, both the conduits 10 and 11 are mounted in the same manner. Therefore, there will be described only one cooling medium conduit 10 as to how it is mounted to the end plate 6. The cooling medium conduit 10 is inserted into the communicating hole 9 of the auxiliary plate 7 having soldering material 12 coated to both the front and reverse surfaces thereof, and the end portion of the conduit 10 is positioned in an intermediate portion of the communicating hole 9 as shown in FIG. 5(a).

Figure 5B:
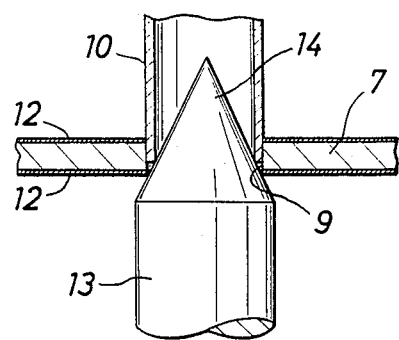
Figure 5C:
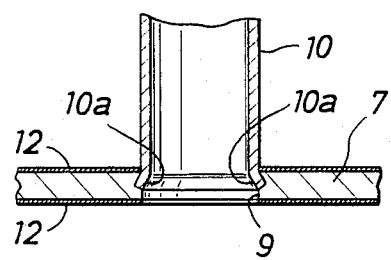

While maintaining the above-mentioned state, the tip portion 14 of the jig 13 is pushed into the communicating hole 9 and into the cooling medium conduit 10 from under the communicating hole 9 by suitable means as shown in FIG. 5(b). As a result, the end portion of the cooling medium conduit 10 within the communicating hole 9 is spread outwards by the tip portion 14, and the tapered and widened tubular portion 10a, as shown in FIG. 5(c), bites into the inner wall of the communicating hole 9, while the peripheral surface of the basic portion thereof is engaged with the edge of the upper opening portion of the communicating hole 9. As a result, the space between the peripheral surface of the cooling medium conduit 10 and the inner wall of the communicating hole 9 is closed within the communicating hole 9 and an integral relationship between the auxiliary plate 7 and the cooling medium conduit 10 is established, thereby to temporarily secure both of them.

In this case, instead of widening the cooling medium conduit 10, the following means can be employed. That is, the outer diameter of the conduit 10 is set as such that it is able to be press fitted into the communicating hole 9, and such conduit 10 is press fitted into the communicating hole 9 and temporarily secured.

Figure 5D:
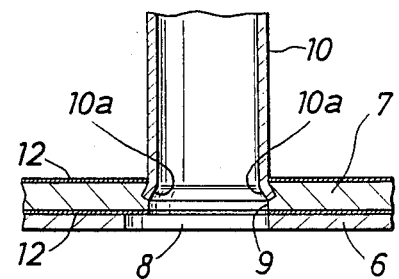

In this way, when the cooling medium conduits 10 and 11 are temporarily secured within the communicating holes 9 of the auxiliary plate 7, the auxiliary plate 7, as shown in FIGS. 5(d) and 4, is positioned in a predetermined position on the end plate 6 wherein the cooling medium conduits 10 and 11 and the communicating holes 8 are communicated with each other, and the foregoing state is maintained by a suitable clip means. The end plate 6 is held in a predetermined position of the header plate 5 defining the outer ends of the upper and lower headers 2 and 3, by a suitable clip means. The plurality of header plates 4 and 5 with a soldering material coated to both inner and outer surfaces thereof, are faced with each other and held in that state by a suitable clip means, with the jointing edges thereof abutted.

In this way, while temporarily securing the various component parts of the evaporator 1 in a predetermined position by a clip, these are carried into a soldering furnace (not shown). When the temperature inside the soldering furnace is raised to a predetermined level, the soldering material 12 coated to the header plates 4 and 5 and the auxiliary plate 7, is melted. The adjacent header plates 4 and 5 are soldered by means of the melted soldering material. Similarly, the end plate 6 is soldered to the header plate 5, while the auxiliary plate 7 is soldered to the end plate 6. Likewise, the end portions of the cooling medium conduits 10 and 11 are soldered to the auxiliary plate 7.

When the cooling medium conduits 10 and 11 are soldered, since the peripheral portion of the communicating hole 9 of the auxiliary plate 7 is plane and the spaces between the peripheral surfaces of the conduits 10 and 11 and the inner walls of the communicating holes 9 are closed generally at position where the widening portions 10a and 11a are formed, the soldering material 12 coated to the outer surface of the auxiliary plate 7 is not flowed down after the soldering material 12 is melted and stayed in that position. Only the soldering material 12 around the cooling medium conduit 10 is flowed into and pooled in the spaces between the peripheral surfaces of the cooling medium conduits 10 and 11 and the inner walls of the communicating holes 9. When the soldering material 12 is hardened, the cooling medium conduits 10 and 11 are soldered. In this case, since the cooling medium conduits 10 and 11 and the auxiliary conduit 7 are temporarily secured as described, no displacement occurs during the carriage or soldering thereof, and the soldering can be smoothly and correctly performed.

Accordingly, contrary to the conventional soldering device of this type, no shortage of soldering material occurs. Moreover, a retreatment of the welding owing to poor soldering, is not required. In addition, the soldering strength of the cooling medium conduits 10 and 11 is ensured, because the spaces between the peripheral surfaces of the conduits 10 and 11 and the inner walls of the communicating holes 9 are so narrow as to increase, for example, the tension strength thereby to increase the mechanical strength thereof. Moreover, since the aforementioned securing force is accompanied thereto during the temporary securement, the mechanical strength is greatly increased.

On the other hand, when the soldering of the cooling medium conduits 10 and 11 is performed under a uniform temperature within the furnace, the thickness of the auxiliary plate 7 has some relation with soldering timing or soldering quality with respect to other members such as header plates 4 and 5, etc. on one hand, while it has some relation with whether the supporting state of the cooling medium conduits 10 and 11 is good on the other hand.

That is, if the thickness of the plate becomes larger, the heat capacity is increased to that extent. As a result, the melting temperature of the soldering material 12 becomes high. On the other hand, if the header plates 4 and 5, etc. having a smaller thickness than that of the auxiliary plate 7 are employed, the heat capacity becomes small compared with the auxiliary plate 7 and the melting temperature of the soldering material becomes lower to that extent. As a result, a soldering timing of both the members becomes different which greatly affects the outcome of the soldering. Likewise, if the thickness of the auxiliary plate 7 is changed with respect to the cooling medium conduits 10 and 11, the contacting area thereof with respect to the cooling medium conduits 10 and 11, is changed through the communicating holes 9, and the stability of the supporting state thereof is changed which affects the falling of the conduits 10 and 11, i.e., the right angle degree with respect to the auxiliary plate 7 and the irregularity of the pitch thereof.

From the above-mentioned view points, the inventors carried out soldering tests of the cooling medium conduits 10 and 11 by changing the thickness of the auxiliary plate 7 under the same temperature within the furnace and checked whether the shortage of soldering material was present or not in the peripheral portion of each of the testing conduits 10 and 11, and the irregularity of the pitch was measured. By totally reviewing thereof, the most desirable thickness of the auxiliary plate 7 was obtained.

Figure 6:
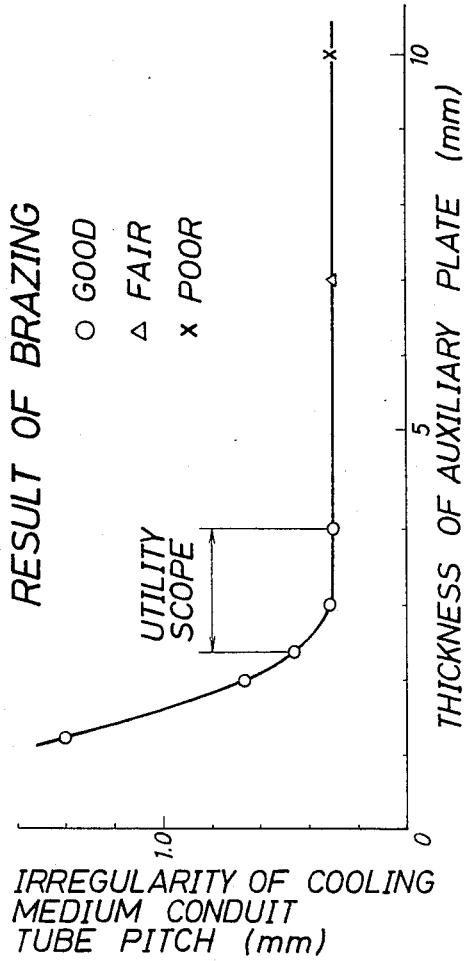
FIG. 6 is a graph showing test data representing the results of soldering obtained by changing the thickness of the auxiliary plate.

FIG. 6 shows the test results. In the figure, the term "good" means that no shortage of soldering material was present in the peripheral portion of the testing conduits 10 and 11 are all, the term "fair" means that a few shortages of soldering material was present, and the term "poor" means that a shortage of soldering material was present in a half periphery or more of the conduits 10 and 11. According to the above-mentioned figure, it is confirmed that the shortage of soldering material is increased as the auxiliary plate 7 becomes thicker and the quality of the soldering becomes poorer. On the other hand, it is also confirmed that the irregularity of the pitch of the cooling medium conduits 10 and 11 is lowered and stabilized. Furthermore, when this is more carefully reviewed, the following facts are confirmed. That is, the quality of the soldering starts degrading about the time when the thickness of the auxiliary plate 7 exceeds 4 mm, and the irregularity of the pitch is suddenly lowered and stabilized about the time when the thickness of the auxiliary plate 7 exceeds 2.4 mm.

Based on these test results, the most desirable thickness of the auxiliary plate 7 was totally sought. As a result, it was found out that the actually useful thickness of the auxiliary plate 7 is 2.4 to 4.0 mm. That is, the quality of the soldering of the cooling medium conduits 10 and 11 can be maintained in a satisfactory level by seeking the most desirable thickness of the auxiliary plate 7, and the retreating work due to poor soldering work becomes unnecessary. In addition, by lowering and stabilizing the irregularity of the pitch of the cooling medium conduits 10 and 11, the box type expansion valve 15 can be smoothly and easily mounted to the conduits 10 and 11.

What is claimed is:

1. A soldering structure of a thin tubular material and an aluminum plate material, said soldering structure comprising:
    a thin tubular material having first and second ends, said thin tubular material having an inner and an outer surface, and said outer surface being a soldering-material-free surface;
    an aluminum plate material having front and back outer surfaces and having a soldering material coating on each said front and back outer surface thereof, and said aluminum plate material being thicker than said tubular material;
    a communicating hole in said aluminum plate material and extending therethrough, said communicating hole having a constant diameter, and the surface of said communicating hole being a soldering-material-free surface;
    said first end of said tubular material being in said constant diameter communicating hole and at an intermediate portion of said communicating hole, said first end of said tubular material having a flange-shaped widened tubular portion, said flange-shaped widened tubular portion biting into and fixedly engaging an inner wall of said intermediate portion of said communicating hole for causing said tubular material and said aluminum plate material to be secured prior to soldering, and for blocking off a clearance between said soldering-material-free surface of said communicating hole and the outer soldering-material-free surface of said tubular material for defining a pooling region adjacent to said front and back outer surfaces of said aluminum plate material having said soldering material coating for causing soldering material from said soldering material coating to be pooled therein during soldering; and wherein said flange-shaped widened tubular portion of said first end of said tubular material is formed by the insertion of a jig having a tapered tip portion into said first end of said tubular material positioned at said intermediate portion of said communicating hole, and whereby said soldering structure ensured proper pooling of said soldering material in said pooling region during soldering for proper joining in said tubular material and said aluminum plate material when said soldering material is hardened.

2. A soldering structure as in claim 1, wherein said jig has at a basic end side of its tip portion a pressurizing portion including a plain pressurizing surface having a larger diameter than that of the tip portion, said pressurizing portion is abutted against the rear or back surface of said aluminum plate material when said jig is inserted, and said communicating hole is deformed under pressure for forming a recess portion at a marginal area of an opening portion of its rear or back surface side by insertion of said jig.

3. A soldering structure as in claim 2, wherein said soldering is a furnace soldering, said aluminum plate material, when soldering, is in the range of from 2.4 mm to 4.0 mm in thickness, said thin tubular material is in the range of about 1.2–1.4 mm in thickness, and the furnace soldering temperature is in a range of 580°–620° C.

4. A soldering structure as in claim 1, wherein said soldering is a furnace soldering, said aluminum plate material, when soldering, is in the range of from 2.4 mm to 4.0 mm in thickness, said thin tubular material is in the range of about 1.2–1.4 mm in thickness, and the furnace soldering temperature is in a range of 580°–620° C.

5. A soldering structure of a thin tubular material and an aluminum plate material, said soldering structure comprising:

a thin tubular material having first and second ends, said thin tubular material having an inner and an outer surface, and said outer surface being a soldering-material-free surface;

an aluminum plate material having front and back outer surfaces and having a soldering material coating on each said front and back outer surface thereof, and said aluminum plate material being thicker than said tubular material;

a communicating hole in said aluminum plate material and extending therethrough, said communicating hole having a constant diameter, and the surface of said communicating hole being a soldering-material-free surface;

a first end of said tubular material being in said constant diameter communicating hole and at an intermediate portion of said communicating hole, a marginal area of said aluminum plate material directly adjacent said communicating hole having a plurality of raised and deformed portions, said plurality of raised and deformed portions biting into and fixedly engaging the outer soldering-material-free surface of said tubular material for causing said tubular material and said aluminum plate material to be secured prior to soldering, and for blocking off a clearance between said soldering-material-free surface of said communicating hole and said soldering-material-free surface of said tubular material for defining a pooling region adjacent to said front and back outer surfaces of said aluminum plate material having said soldering material coating for causing soldering material from said soldering material coating to be pooled therein during soldering; and wherein said plurality of raised and deformed portions are formed by the insertion of respective jigs into said aluminum plate material at said marginal area of said plate material directly adjacent said communicating hole.

6. A soldering structure as in claim 5, wherein said soldering is a furnace soldering, said aluminum plate material, when soldering, is in the range of from 2.4 mm to 4.0 mm in thickness, said thin tubular material is in the range of about 1.2–1.4 mm in thickness, and the furnace soldering temperature is in a range of 580°–620° C.

* * * * *